THOMAS SHAW, OF PHILADELPHIA, PENNSYLVANIA, ASSIGNOR TO HIMSELF AND PHILIP S. JUSTICE.

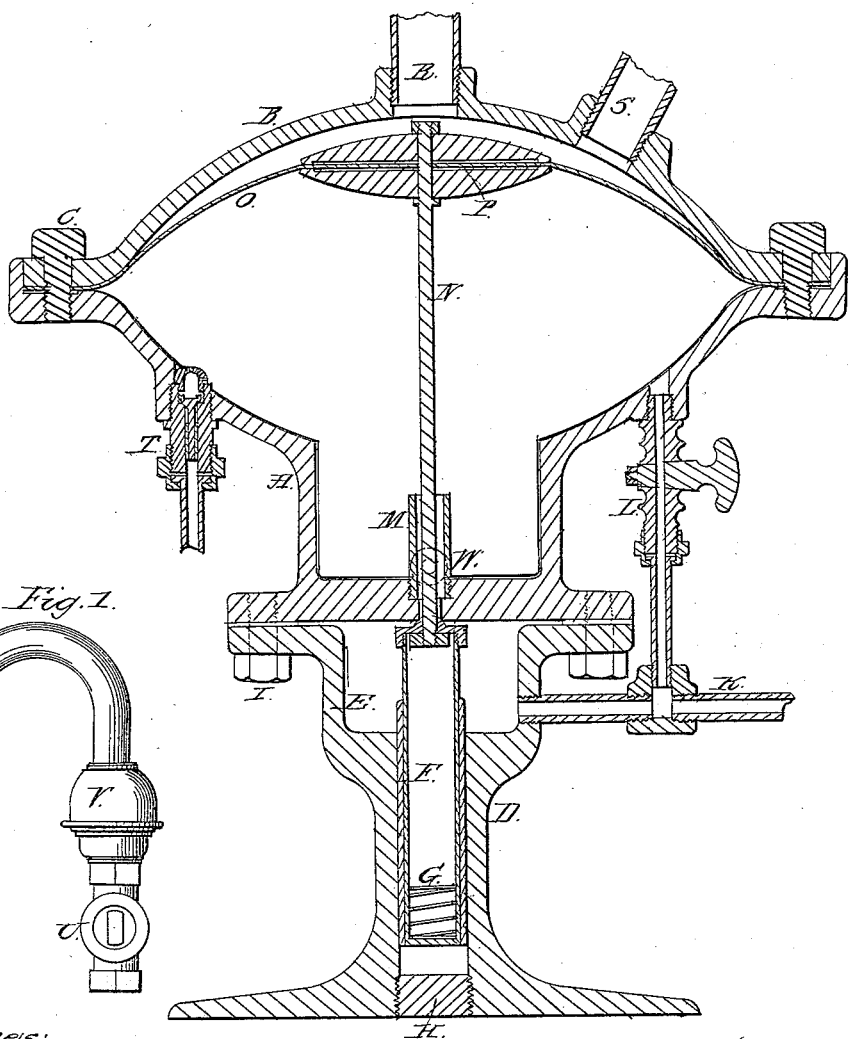

Letters Patent No. 84,912, dated December 15, 1868.

IMPROVED PUMPING-ENGINE.

The Schedule referred to in these Letters Patent and making part of the same.

*To all whom it may concern:*

Be it known that I, THOMAS SHAW, of the city and county of Philadelphia, Pennsylvania, have invented a new and improved Pumping-Engine; and I hereby declare the following to be a full, clear, and exact description of the same, reference being had to the accompanying drawing, and to the letters of reference marked thereon.

My invention consists in the mode of employing the diaphragm, and in the mode of operating the valves as hereafter described.

In order to enable others to use and practise my invention, I will proceed to describe its construction and operation.

On reference to the accompanying drawing, which forms part of the specification—

Figure 2 represents a vertical section through centre of engine.

Figure 1 represents the hot-water and air valve to be connected with pipe, with aperture, represented by dotted lines W.

A and B are cast-iron concave chambers united by screws C, intervening which is a cotton-duck diaphragm, O, the centre of which is clamped disks P held by screw on end of valve-rod N. Said rod is provided with a nut on its lower end, which plays loosely into the hollow part of valve, as hereafter described.

D is a cast-iron base secured to chamber A by means of screws I, intervening which is formed steam-chest E. Said base D is bored for the reception and guidance of valve F, the bottom of aperture being closed by plug H.

Valve F forms a seat and closes against aperture in bottom of chamber A, and is provided with a spring, G, for the purpose as hereafter described.

K is a steam-pipe leading to chest E, and through valve L, as hereafter described.

S is an inlet-pipe for water, to be provided with an ordinary check-valve, opening inward.

R is an outlet-pipe, to be provided with a check-valve, opening outward.

T is the injector, for the purpose of throwing spray of water into chamber N, and is provided with a valve opening inward. Said injector is connected by tubing with outlet-tube R, where it can receive a supply of water.

W is a well for the reception of condensed steam and injected water.

M is a tube for the conveyance of steam above the surface of said water, as hereafter described.

U is an ordinary stop-cock for regulating the flow of hot water from well which passed out of aperture W through tubing to said cock U.

V is the exterior of an ordinary valve, provided with an outlet-pipe, X.

The interior of chamber A is coated with a non-conducting substance in the shape of vulcanized rubber or cement.

The cotton-duck diaphragm O should be coated with rubber or other material impervious to water or steam.

The engine is put in operation in this wise:

Steam is allowed to flow into pipe K, and through valve L into the chamber beneath diaphragm O. The pressure of steam lifts said diaphragm O against the walls of chamber B, and blows the air and condensed steam out of aperture W, through valve V. This operation is allowed to continue until all the air is blown out, when valve L is closed. The steam continues to blow out of aperture W until the pressure in chamber N is reduced below weight of column of water in pipe that connects with injector T, at which time the water spurts in a spray into chamber N, condensing the steam and forming a vacuum, at which period the inlet water rushes in through pipe S, which continues until the diaphragm assumes its lowest position, where the descending nut on lower end of valve-rod N comes in contact and presses upon spring G until sufficient force is accumulated to press valve F from its seat, when said valve is thrown suddenly away from its seat by reason of accumulated force of said spring.

Immediately on said valve being thrown from its seat the steam rushes into chamber N through pipe M, causing pressure, which arrests the flow of injector T, lifts diaphragm O, forcing the water just received through pipe S out of pipe R. In the mean time the same steam-pressure discharges the accumulated water from condensed steam out of aperture W. This operation continues until the diaphragm assumes its highest position, when the afore-mentioned nut on lower end of valve-rod comes in contact with the top of valve F and lifts it to its seat, where it is held by pressure of steam in chest E, when the heavy pressure of steam in chamber N will be lowered by passing out of aperture W, and the injector will again spurt in, and the vacuum be formed, when the diaphragm will descend and operate the valve, as before described.

It will be observed that the diaphragm floats in the pressure, and has no strain put upon it other than sufficient to lift disks P and valve-rod N, and that the valve U can be regulated to allow only the condensed steam to pass out.

It will be evident that various materials can be used in the construction of the diaphragm, and that the valves need not be in the precise location to produce the result.

What I claim, and desire to secure by Letters Patent, is—

1. Operating valve F in the manner set forth.
2. The arrangement of valve L with steam-chest E for starting the engine, as described.
3. The combination of valves V and U with well W, as specified.
4. Controlling the injector in the manner specified.

THO'S SHAW.

Witnesses:
E. COBB,
ELIAS J. SHAW.